(12) United States Patent
Mitchell (10) Patent No.: US 11,057,481 B2
(45) Date of Patent: Jul. 6, 2021

(54) METHOD AND SYSTEM FOR CREATION AND DISTRIBUTION OF NARRATED CONTENT

(71) Applicant: ModioLegal, LLC, New York, NY (US)

(72) Inventor: Kevin Mitchell, New York, NY (US)

(73) Assignee: ModioLegal, LLC, New York, NY (US)

( * ) Notice: Subject to any disclaimer, the term of this patent is extended or adjusted under 35 U.S.C. 154(b) by 218 days.

(21) Appl. No.: 15/951,754

(22) Filed: Apr. 12, 2018

(65) Prior Publication Data

US 2018/0234512 A1 Aug. 16, 2018

Related U.S. Application Data (63) Continuation of application No. 14/490,007, filed on Sep. 18, 2014, now Pat. No. 9,986,051.

(60) Provisional application No. 61/879,332, filed on Sep. 18, 2013.

(51) Int. Cl.
| | |
|---|---|
| *G06F 3/00* | (2006.01) |
| *H04L 29/08* | (2006.01) |
| *G06F 16/435* | (2019.01) |
| *H04N 21/258* | (2011.01) |
| *H04N 21/442* | (2011.01) |
| *H04N 21/488* | (2011.01) |
| *H04N 21/81* | (2011.01) |

(52) U.S. Cl.
CPC ............ *H04L 67/22* (2013.01); *G06F 16/435* (2019.01); *H04N 21/25891* (2013.01); *H04N 21/44222* (2013.01); *H04N 21/4882* (2013.01); *H04N 21/8106* (2013.01)

(58) Field of Classification Search
CPC ........ G06F 17/30029; H04N 21/25891; H04N 21/44222; H04N 21/4882; H04N 21/8106
See application file for complete search history.

(56) References Cited

U.S. PATENT DOCUMENTS

| | | | |
|---|---|---|---|
| 8,006,261 B1* | 8/2011 | Haberman | G11B 27/031 725/32 |
| 2006/0168507 A1* | 7/2006 | Hansen | H04N 21/2335 715/202 |

(Continued)

*Primary Examiner* — Anil N Kumar
(74) *Attorney, Agent, or Firm* — Bechen PLLC; Timothy J. Bechen (57) ABSTRACT

The electronic content generation and distribution method and system includes designating a written content for audio translation by a narrator and determining the narrator. The method and system provides written content to the narrator to generate an audio narration, receiving the audio narration back from the narrator. The method and system therein assigns a plurality of content identifiers to the audio narration based at least one the written content, accesses a subscriber database including subscriber information and subscriber preference data and electronically compares the plurality of content identifiers to the subscriber preference data to determine a distribution list. The method and system distributes the audio narration to subscribers designated in the distribution list so that the subscriber can engage the audio narration via a content interface, where the content interface is operative to monitor the subscriber engaging the audio narration.

17 Claims, 6 Drawing Sheets

(56) References Cited

U.S. PATENT DOCUMENTS

2007/0118801 A1* 5/2007 Harshbarger ........ G11B 27/031
    715/730
2011/0307779 A1* 12/2011 Scholler ............. G06F 21/6218
    715/705
2012/0240045 A1* 9/2012 Bradley ................. G10L 13/04
    715/716

* cited by examiner

METHOD AND SYSTEM FOR CREATION AND DISTRIBUTION OF NARRATED CONTENT

RELATED APPLICATIONS

The present application relates to and claims priority to U.S. patent application Ser. No. 14/490,007 entitled "METHOD AND SYSTEM FOR CREATION AND DISTRIBUTION OF NARRATED CONTENT" filed Sep. 18, 2014, which claims priority to U.S. Provisional Patent Application No. 61/879,332 filed Sep. 18, 2013.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to methods and systems for generating audio content based on existing content sources, as well as distributing the audio content and managing user interaction with said content.

BACKGROUND OF THE INVENTION

Existing techniques provide for the distribution of written content and audio content. Many of these techniques fail to either accommodate the needs of the reader/listener, and/or provide limited value to the content providers.

The Internet offers, numerous sources to satisfy the market need along the attribute dimension of written content; print publishers' primary basis of competition with each other and their primary differentiator relative to television and radio. Publishers in the print media industry have sought to address the disruptive impact of the Internet by either enhancing the attributes of their content, e.g. subscriber customization and/or more analysis, or reducing price to improve circulation. Fundamentally, written content publishers are confronted with a problem of allowing the reader to effectively manage his or her time because the reader must then dedicate all attention and focus to reading the distributed content. For example, many professionals must decide how to best manage their time, either dedicate time to reading time sensitive content or attending to client work.

Thus, there continues to be disruption in the print media industry as a result of the commoditizing impact of the Internet, and limitations to the effectiveness of consuming print content because subscribers have to read it.

Professionals in a variety of dynamic industries have a need for certain types of timely trade information necessary in order to conduct their jobs or deliver their services to clients. The severe opportunity cost of accessing content can be inefficient and overly time consuming for a professional. Professionals have sought to balance the need for staying current with the high opportunity cost of reading relevant content by accessing information in an audio format.

However, current audio content distribution techniques such as news oriented podcasts do not solve this problem because they are lengthy in nature, typically covering multiple topics on the same file all of which may not be relevant to the listener, and usually have less frequent or irregular circulation. Similarly, podcasts that take an in-depth look at a certain topic, are not germane to breaking news or information. Moreover, podcasts require a fair amount of user intervention and preparation, including the active download of a podcast, queuing the podcast up for listening and then having to listen through extraneous content to find the pertinent information, e.g. a 5 minute section in a 30 minute podcast. Similarly, podcasts are severely restricted such that a content provider is unable to track the user's interaction with the content, being unable to see if the user actually listened to the content.

Additionally, with print media, there is a need for techniques to convert the content into audio format. One such technique is available from the website Audio.com, where authors and narrators can be paired up. This service provides for a general means for finding a narrator for an author's work, where the narrator is determined based on various factors, including costs to narrate the content. This model however, is related to longer content, such as novels, short stories, etc that is not time-sensitive. Another technique, which could be used for time sensitive content, is computer-generated audio narration. Such techniques however, are extremely non-user friendly and often difficult for the listener, as the computer-generated narration misses various nuances of the article content, including pronunciation, word emphasis, and pauses by way of example. Therefore, human narrations are strongly preferred for user value.

With many working professionals, the value of the content is not only in its ability to be easily consumed, but also in the timeliness. Many professionals are better served with the quick receipt of time-sensitive information, wherein the nature of existing media distribution models do not readily lend to distributing this time sensitive material.

Thus, there exists a need for an improved method and system for generating audio content, distributing said content and moreover tracking the effectiveness of the content.

BRIEF SUMMARY OF THE INVENTION

Generally, the present invention provides for the generation of audio content based on pre-existing content, the collection of the audio content, categorization of such content, and subsequent distribution to end users (subscribers) via an electronic interface.

The present method and system includes a media distribution model for producing, distributing and tracking audio content that is both human narrated and delivered in a time-sensitive manner.

The electronic content generation and distribution method and system includes designating a written content for audio narration by a narrator and determining the narrator based on at least one narrator selection factors. The method and system therein provides the written content to the narrator so that the narrator may generate an audio narration of the written content and electronically receives the audio narration back from the narrator. The method and system therein assigns a plurality of content identifiers to the audio narration based at least on the written content. The method and system accesses a subscriber database including subscriber information and subscriber preference data and electronically compares the plurality of content identifiers to the subscriber preference data to determine a distribution list for the audio narration. Therein, the method and system distributes the audio narration to subscribers designated in the distribution list so that the subscriber can engage the audio narration via a content interface, where the content interface is operative to monitor the subscriber engaging the audio narration. Moreover, the method and system receives engagement tracking information based on the monitoring of the subscribers engaging the audio narration.

As described in further detail below, narrators provide an audio narration of written content, such narrated content is then provided to a distribution source. Via the distribution source, the content is then distributed to end users for audible consumption in lieu of previously requiring the end user to read the content. Moreover, the present invention may also provide for tracking information relating to the audible consumption by the user, such tracking information available for any number of processing operations.

The present method and system provides the combined optimized benefits of existing media platforms to develop a new optimized media of content distribution. The method and system eliminates the focus-attention requirement of written content but retains its more granular article-specific topic selectivity by incorporating on-demand distribution of directed audio content focused on the user's interests. Moreover, via the interface as described herein, the content is further focused based on user preferences or selection and the content generation can be performed by an interested party seeking to impress or otherwise facilitate a professional engagement with the listener.

Moreover, the new media generated herein is further refined based on content aggregation techniques to generate the highest level of user-specific refinements. Therein, the new optimized media delivers highly pertinent user content in a convenient, on-demand format allowing for user consumption in an efficient manner.

A better understanding of the disclosed technology will be obtained from the following detailed description of the preferred embodiments taken in conjunction with the drawings and the attached claims.

DETAILED DESCRIPTION

Figure 1:
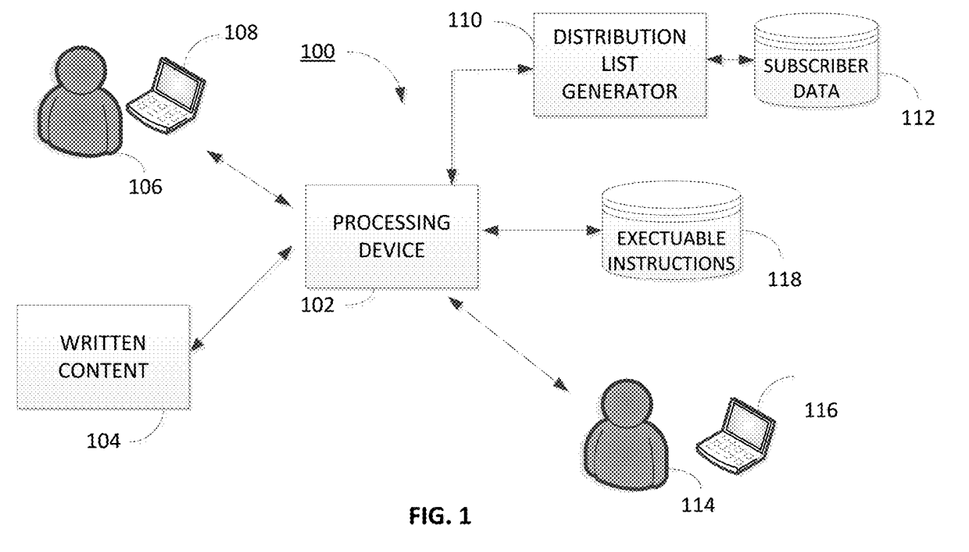
FIG. 1 illustrates one embodiment of a computer processing system providing for electronic content generation and distribution.

FIG. 1 illustrates one embodiment of a system 100 providing for the generation and distribution of audio content. In this embodiment, the system 100 includes a processing device 102, a written content source 104, a narrator 106 with a computing device 108, a distribution list generator 110, subscriber data 112 and at least one subscriber 114 with a computer interfacing device 116. The processing device 102 further includes at least one computer readable medium having executable instructions 118 stored therein such that the processing device 102 is operative to perform processing operations described herein.

The processing device 102 may be one or more processing devices operative to perform processing operations in response to the executable instructions 118. The written content 104 may be any suitable content received from a content distribution source. By way of example, the written content may be a data feed including updates or summations of articles or events. The data feed may include meta data or other identifier data indicating the area of the content.

The narrator 106 may be any suitable person capable of narrating the written content into an audio format. As described in further detail below, embodiments include the narrator selection based on the narrator having familiarity with the content itself. The device 108 may be any suitable type of processing device operative to allow the narrator to record the content, such as a mobile computer, smart phone, or any other suitable device.

The distribution list generator 110 may be one or more processing devices operative to perform operations as described herein. The distribution list generator 110 accesses subscriber data 112, wherein the subscriber data 112 includes any number of data fields indicating content preferences for subscribers. For example, subscriber data may indicate that the subscriber wishes to receive content relating to several different topics. The generator 110 is operative to use data about the written content and/or the audio narration to determine the intended recipients, wherein the list of recipients is designated on the distribution list.

The subscriber data database 112 may be any suitable database hosting information representative of subscriber preferences usable by the generator 110 for comparison and selection operations as described herein.

The processing device 102 further includes functionality for distributing narrated content to the subscriber 114, wherein the content is then accessible via an interface executable within the subscriber's device 116. The device 116 may be any suitable device operative to provide functionality, such as a mobile computer, smart phone, desktop computer, handheld computer, by way of example.

For brevity, operations and functionality of the elements of FIG. 1 are described in further detail below.

Figure 2:
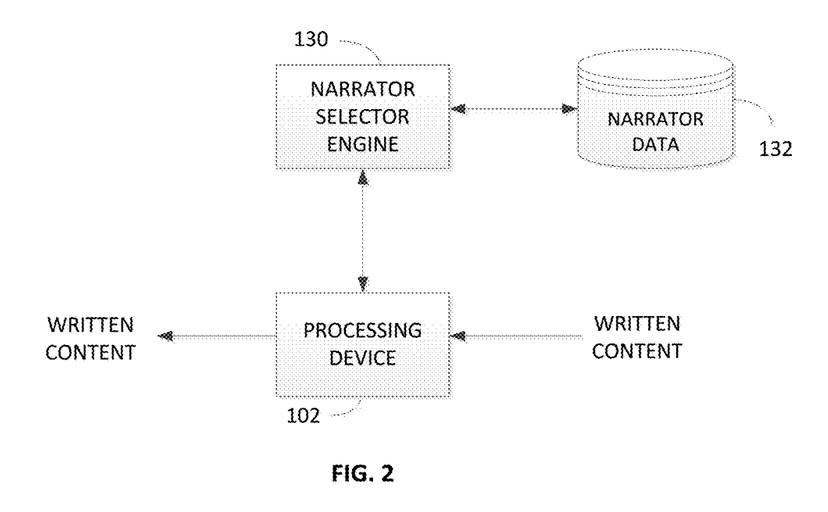
FIG. 2 illustrates one embodiment of a narrator selection engine.

Another aspect or embodiment of the method and system is the narrator selection operations. FIG. 2 illustrates a narrator selection engine 130 in operative communication with a narrator data database 132. The engine 130 is in communication with the processing device 102. The engine 130 may be executable on one or more processing devices, in communication with or even disposed within, the processing device 102. The narrator data database 132 may be any suitable data storage device storage information on various narrators. For example, the narrator data may include a list of the narrator's schedule to indicate availability for generating audio content. The narrator data may include the narrator's background or specialty to help insure the narrator is sufficiently proficient in the underlying content. Narrator data may be any suitable data, including but not limited to the narrator's ranking or experience level, the narrator's fee, or any other suitable information.

In one embodiment, the selection of the narrator is additionally based on motivational aspects for the narrator to provide the highest quality narration available in as quickly as possible. This motivation may be beyond a base salary or narration fee, but rather is within the potential for the narrator to become introduced to professionals in the narrator's future field. For example, if the narrator is a law student, who will eventually be seeking a legal career, the exposure of being a narrator is an additional benefit beyond a mere salary, where the narrator's work-product will then be heard by countless attorneys subscribing to the content. Thus, the audio narration not only provides content to the subscriber, but a means of connecting the narrator with those professionals with whom the narrator may seek employment in the near future. The audio narration also provides the narrator with further education in their desired field.

The processing device 102 receives the written content and therein determines factors usable for selecting or determining a narrator. By way of example, the written content may include factors that it relates to the subject of employment law, is a U.S. Supreme Court decision and is a very time-sensitive subject. Thus, the engine 130 is operative to use these factors to select one of any number of available narrators such that the processing device 102 therein directs the written content to the selected narrator.

It is recognized that the system of FIG. 2 can be incorporated into the system 100 of FIG. 1.

Figure 3:
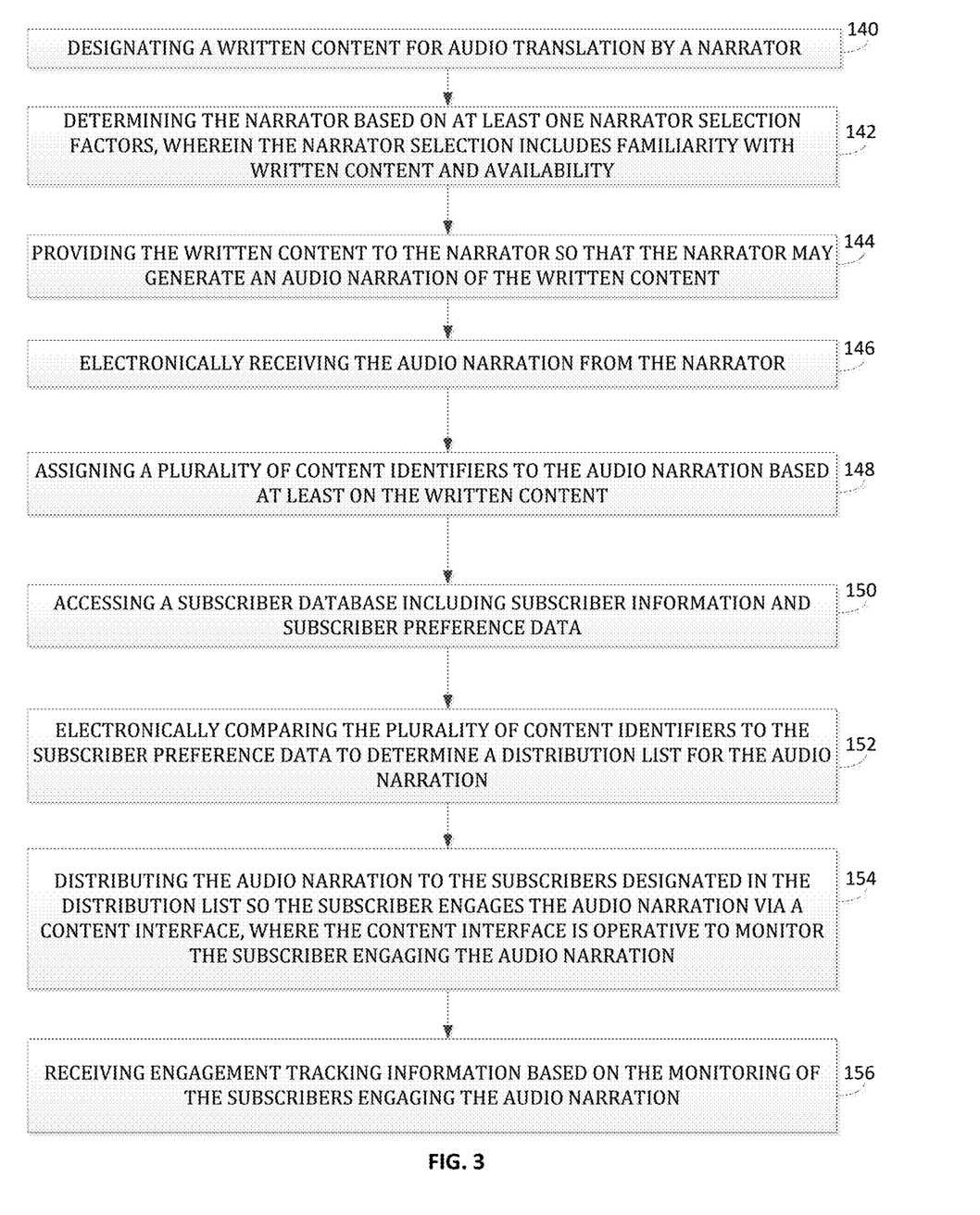
FIG. 3 illustrates a flowchart of the steps of one embodiment of a method for electronic content generation and distribution.

One embodiment of the methodology of the system 100 of FIG. 1 is illustrated in the processing steps of the flowchart of FIG. 3. A first step, step 140, is designating a written content for audio narration by a narrator. With respect to FIG. 1, the engine 102 receives written content and therein determines which content is to be translated into an audio file by a narrator. This step may include determining if the content is duplicative of other content, outdated or simply not having enough value to warrant narration and distribution.

Step 142 is determining the narrator based on at least one narrator selection factors, wherein the narrator selection includes: familiarity with the written content and availability. This step may be performed by the engine 130 of FIG. 2 using any suitable narrator selection factors recognized by one skilled in the art.

Step 144 is providing the written content to the narrator so that the narrator may generate an audio narration of the written content. In one embodiment, the written content is electronically transmitted to the narrator or made accessible via a narrator interface (as described in further detail below). For example, the narrator may receive the written content in its entirety. In another embodiment, the narrator may receive a message that content is awaiting audio translation once the narrator logs into a translation interface.

Step 146 is electronically receiving the audio narration from the narrator. As described in further detail below, the narrator narrates the content by reading the content to be saved as an audio file. The narrator may further include additional related information usable for the subscriber, such as adding meta data or a brief abstract, by way of example.

Step 148 is assigning a plurality of content identifiers to the audio narration based at least one the written content. This step may be performed concurrent with step 146 by the narrator. In another embodiment, this step may be performed by the processing device 102 of FIG. 1.

Step 150 is accessing a subscriber database including subscriber information and subscriber preference data. As described above, the subscriber database includes information on the various subscriber's preferences, usable for determining to whom the translated content should be distributed.

Step 152 is electronically comparing the plurality of content identifiers to the subscriber preference data to determine a distribution list for the audio narration. The distribution list providing for the means of communicating the narrated content to the various subscribers. In one embodiment, this may include a distribution via email or other electronic means of the audio narration. In another embodiment, this may include the loading of the audio narration into the subscriber's account for the audio access interface, as described in further detail below.

Step 154 is distributing the audio narration to subscribers designated in the distribution list so that the subscriber can engage the audio narration via a content interface, where the content interface is operative to monitor the subscriber engaging the audio narration. The distribution does not have to be immediate with the processing of the audio narration, but can be queued for distribution on a designated timely manner and in combination with other narrated content files. For example, the distribution may be on a daily basis, wherein the content is queued up on day 1 and during off-peak transmission hours, the content is then distributed to the subscriber. In one example, a set of audio narrations may be transmitted around 4 a.m. so the subscriber has the content awaiting them first thing in the morning. It is recognized that other embodiments are within the scope of the invention, including immediate transmission, hourly transmission, twice-daily, etc. In one embodiment, the transmission frequency may be determined based on user preference. Further embodiments may include the transmission of high priority content in an immediate fashion, e.g. an alert, where lower-priority content is transmitted on a more routine basis.

As part of the subscriber engaging the audio content, e.g. listening to the audio files, the interface further provides for tracking the user interactions. Step 156 provides for receiving engagement tracking information based on the monitoring of the subscribers engaging the audio narration. Examples of tracking information may include if the user skipped listening to the full article, re-arranged the queue or sequence of the article, re-listened to the article, forwarded or redirected the article to other subscribers, or any other suitable interaction.

It is recognized that additional steps are within the scope of the present method, wherein the above-noted steps are illustrative of one embodiment and not limiting in nature.

Generally, relative to the method and system, content distribution may be on a subscriber basis including any number of suitable financial arrangements. One embodiment may include a user subscribing to a news distribution outlet that generates articles or summaries on a periodical, e.g. daily, basis. The narration may be a third-party service wherein the news distribution outlet provides original copies of the articles to narrators for audio file generation. The narrations are generated and then made available to subscribers as a regular feature or premium feature.

In another embodiment, the content distribution company itself may a) generate the audio narration as part of the distribution, whereby the narrators can be paid via the subscriber costs or b) embed the present method and system on a third party basis into its existing website.

In yet another embodiment, the narration services may be an academic venture allowing for greater student exposure. For example, a law school may provide narration to a content distribution company allowing for student-access to professionals as described herein.

In one embodiment, any typical narrator may be utilized. For example, in one embodiment where the audio narrations are generated concurrent with the written content, the narrations may be performed by an employee or designated specialist with knowledge of the underlying field. For example, one embodiment may include the article author narrating the content. In addition to narrator selection, the method and system provides for content distribution and management as described herein.

In another embodiment, the system can include one or more algorithms for identifying inexpensive narrators that have a strong incentive to provide quality narrations, familiarity with the subject matter of the content such that they know special terminology/industry jargon, and flexibility in their schedule such that they can deliver the narrations in a timely manner. For example, one embodiment may include using college students or graduate students studying the field corresponding to the content satisfies all these criteria.

Using law students as an example, culturally there is a willingness to accept minimal compensation in the context of jobs that provide high exposure to future employment opportunities. Because the narrations represent an opportunity to gain exposure to future employers, they are highly incentivized to produce quality narrations. As described in further detail below, there may also be a means whereby the students will be associated with the articles they narrate; namely at the beginning of each narration, they will say the name of the publication, the title of the article, the author and their name, school year and school. The system also includes a mechanism viewable by all subscribers whereby subscribers can review narrator's performance using a rating system. Law students have a familiarity with legal content since this is what they are studying. Finally, they have flexible schedules in the sense that their only fixed activities are typically 3-4 hours a day of class time.

This system includes a means for narrators to record article-specific content narrations wherever they are and quickly return the files to the company using devices that the narrators are likely to already have. Any suitable recording means be utilized, such as a digital recorder or coordinating with a laptop or desktop computing device. In one embodiment, the narrators will use voice memo apps available through their smart phones or other type of mobile device (e.g. tablet computer as one example) to record their narrations. In one example, the narrator may use a standard voice memo application that comes with the mobile phone.

After making the narration, the narrator may therein electronically transmit the narration file back to the company either directly or via an intermediary server. For example, one embodiment may include electronically mailing the voice file. Another embodiment may include a data upload operation via a secure or dedicated socket. The uploading may be at the narrator's direction, or in another embodiment may be an automated feature upon the completion of the file recording and the user acknowledging the narration is complete.

Another embodiment provides for more streamlined functionality for uploading articles to the platform-ability for the platform to automatically convert audio files to the appropriate format to play on the website. For example, using the voice memo app on a smart phone creates an audio file in M4a format. If website plays mp3s, the platform may therein automatically assess the file format, determine if it is a format compatible with the player on the platform, and if not, automatically convert it to the appropriate format, and then upload it.

Within the audio interface, users can make article specific topic selections (~3-5 min files) versus having multiple topics on same file (~30-50 min files). Thus the users get higher topic selectivity and more efficient listening because they do not have to listen to a 30-minute file just to learn that the last topic covered on the file is the only one relevant to them. The specificity resembles the granularity of written content and improves the convenience and efficiency of the audio format. This specificity also creates the opportunity for more effective tracking capabilities. If there are multiple topics covered on the same file then it is impossible to know which topics were more relevant to the user.

Another improvement is Streaming because the audio files are smaller, they can be accessed in a timely manner through streaming at the time the user wants to access them versus having to deviate from existing habits to download big files in advance (ex. Before leave house, have to download file off computer—this also dilutes the convenience/efficiency of the audio format). Additionally because the content is streaming, back end processing systems are able to track listening habits versus downloading habits—a more direct indictor of consumption and thus a more valuable metric. In one embodiment, the interface as described in further detail below, may include the ability to detect when the subscriber or user is within a wi-fi environment and thus allow for automatic download, e.g. push, of new narrated content. Therein, the method and system can minimize disruption to a user's wireless data plan and seamlessly integrate the audio narrated content without causing the user to incur additional fees from a wireless service provider. Similarly, these push or pull functions may be defined by the user in a setting feature of the interface. In another embodiment, the user interface may manage content storage, as well as distribution, including for example the elimination or purging of outdated content from the user's account, interface, device etc.

Another improvement is an on-the-go interface, designed with the mobile/on-the-go user in mind-big text, big buttons, intuitive functionality versus standard website designed for desktop access. The method and system interface is designed to integrate content from multiple sources which gives the user the ability to put the interface on "autopilot" and listen to pre-selected articles from multiple sources in sequence without having to use controls (convenient while on the go, important for driving).

The method and system may further be repeated on a recurring daily basis for: creating article-specific audio files of print content and submitting them to a group of narrators; uploading the audio files onto one or more websites; making the audio files accessible to subscribers on a publication, article and date specific basis through an interface, including in one embodiment a web-based smart phone enabled interface; and tracking subscribers content consumption habits through the interface's publication, article and subscriber oriented analytics.

While recordation can be performed at the client-side, e.g. using a narrator's mobile computing device, the narration can be centrally cataloged on one or more servers. The invention includes one or more techniques for article-specific audio files to be received from the narrators and uploaded onto a distribution portal, such as a company's website. In one embodiment, the audio file can be linked or otherwise associated with a text copy of the article.

One embodiment includes the pairing of narrators in a quality control mechanism. For example, paired narrators alternate days for generating audio content, e.g. reading the articles. While one narrator generates the audio content, the other narrator reviews the narration to insure accuracy with article. Thus, in one embodiment, the second narrator may designate an article for distribution after review and approval.

In another embodiment, the narrator selection may be performed in a bid or reverse process, whereby the article is made available to multiple potential narrators. The narrators may then bid or otherwise request the ability to narrate the content, based on any number of factors including but not limited to narrator experience, content topic, availability, narrator rating, pay for narration, etc.

Figure 4:
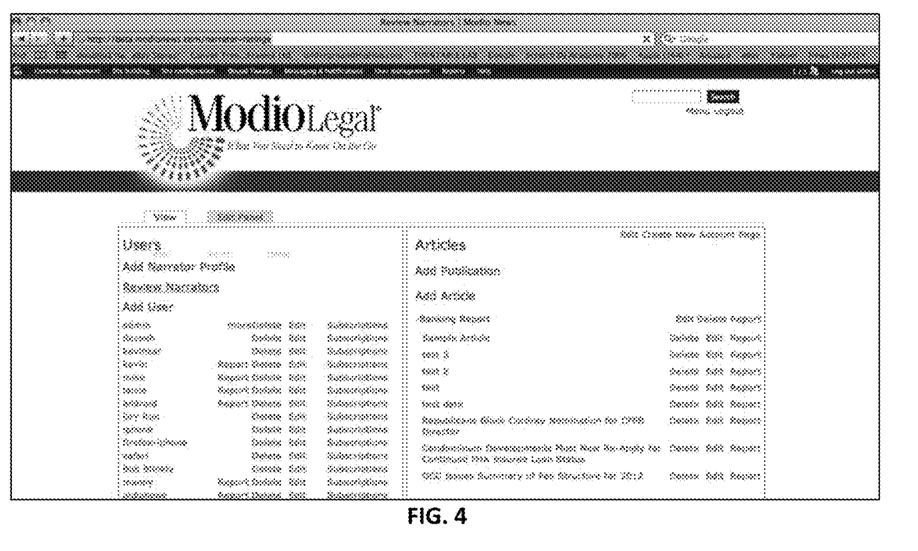
FIG. 4 illustrates a sample screenshot of a content management interface screen.

FIG. 4 illustrates a sample screen shot of a plurality of articles with available audio files, and in the accompanying screen, the text version of the article. The sample screenshot of FIG. 4 shows the page in which a narrator can upload articles, by selecting an add article button. Therein in one embodiment of the user interface, this therein takes the user to screens of FIGS. 5-6.

Figure 5:
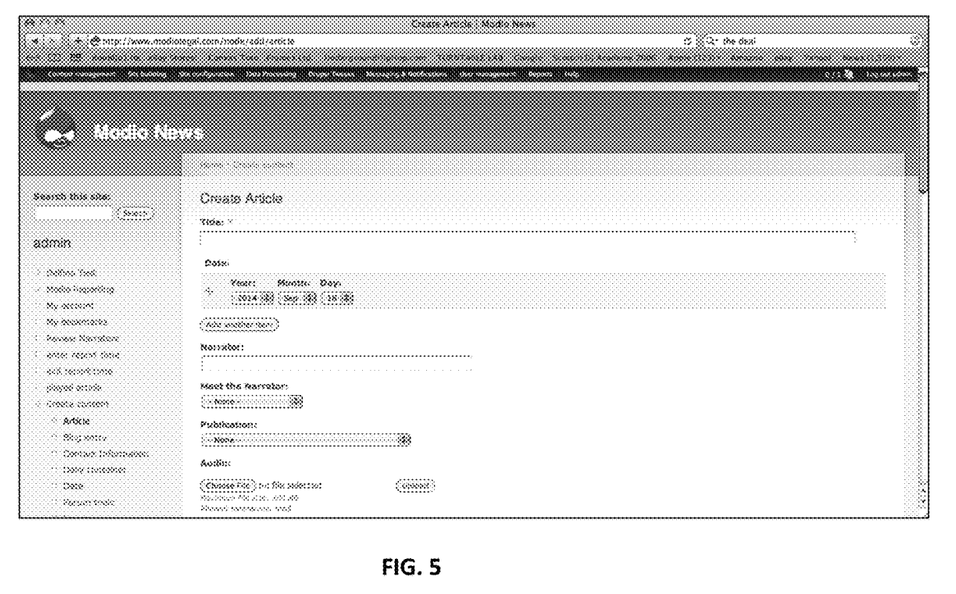
FIG. 5 illustrates a sample screenshot of an interface for the uploading of narrated content.
Figure 6:
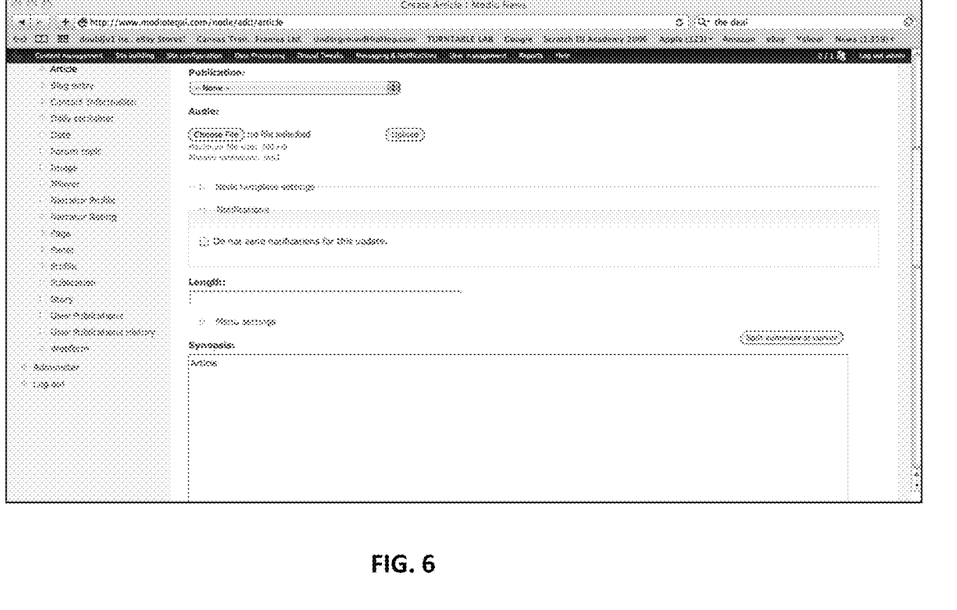
FIG. 6 illustrates a sample screenshot of an interface for uploading narrated content, including assigning data therewith.

FIGS. 5-6 illustrate sample screenshots of further embodiments of an interface for narration generation or uploading, including the creating and uploading of a narrated article for subsequent processing and distribution. In this example, the narrator may directly upload the article to a web location or otherwise create the template for the audio narration via the web portal. In this example, the user may use any suitable web browser having a networked connection. In one embodiment, the article is created in the narrator interface, whereby the service provider reviews the article narration and once approved, it made available for distribution. The inclusion of the narrated article can further include meta data or other identifier data usable for the article, such data including but not limited to the title, author, area of interest, time of article, narrator information, etc.

Articles uploaded to the system can be stored in one or more storage devices, including cloud-based storage or other storage means. For example, the narration and articles may be centrally stored, or stored in a distributed manner. The articles and narrations are stored in one or more storage devices accessible by the distribution system, wherein the storage includes storage having associated description data allowing for searching or other database access operations, as described in further detail below.

Once articles are uploaded on to the site, the system provides subscribers with multiple means for accessing content: periodic email links matching the frequency of the underlying publication(s), an icon on the home screen of their smart phone or tablet, or through any internet browser; wherein in one embodiment in using this method, the user may be required to refresh the screen once on the interface in order to update their content. Another embodiment may be an automated distribution feed, e.g. RSS feed, an email notification system, a smartphone application or other means. The notification may be either (or both) a push/pull system allowing for users to query if new articles are available, and/or to be notified when content is available.

There are different notification techniques. A first technique is notification via email. A second notification is via a smartphone interface, such as either an application (app) or via email notification on the mobile device.

Once on the website or accessing via an app, the subscriber logs onto the site using a username and password that in addition to general information is tied to:

The publications they are subscribed to, including the publication that the subscriber has designated as their primary publication Their demographic information including age, gender, area of specialty (if applicable), job position, years experience, average daily one-way commute and means of commute.

In one embodiment, a security system has been incorporated into the interface whereby a given username can only be logged on using one device at a time. If a subscriber tries to log on using a second device, they will be required to disconnect the session on the prior device first. Once a subscriber is logged on using a given device, that device will stay logged on to the interface so long as the subscriber does not affirmatively log off the interface or try logging on using a different device; thus eliminating the requirement for a subscriber to log on each time they come on to the interface.

It is recognized that other security and user log-in techniques may be utilized. For example, one technique may include a generalized or community accepted login, or acceptance of a partnered-site login. For example, in one embodiment, the interface may receive a log-in and password for another website or portal, such that verification of that log-in grants access to the audio narration interface. This not only provides simplicity of a common login, but also allows for further partnering with other service providers. For example, if the user subscribes to a third-party content distribution service and that service offers audio narration as an add-on feature, the inclusion of the common login allows for verification of the user and coordination of subscription information, e.g. verifying that the user is authorized to access the narrated content or charging the user the appropriate amount to access the service; i.e. the cost of the third party content distribution service's underlying subscription or just the cost of the add-on feature.

Assuming that a subscriber is logged on and using one of the means of access described above, the landing page for each subscriber will show a listing of the articles corresponding to the most recent day's news for the publication the subscriber has previously designated as his or her primary publication. In the example below, the subscriber's primary publication is Daily Law Report. The text of the article titles is deliberately made bigger for easier viewing while on the go.

In addition to the login and user verification, the method and system further includes subscription monitoring and access controls. This may be performed consistent with known techniques, such as providing a stand-alone subscription to a user or a group of users, or combining the subscription with another subscription or service. Where the user pays for the subscription, fee collection may be performed using any known technique. By contrast, the system may supplement paid subscription with a advertisement-based service as described below.

Figure 7:
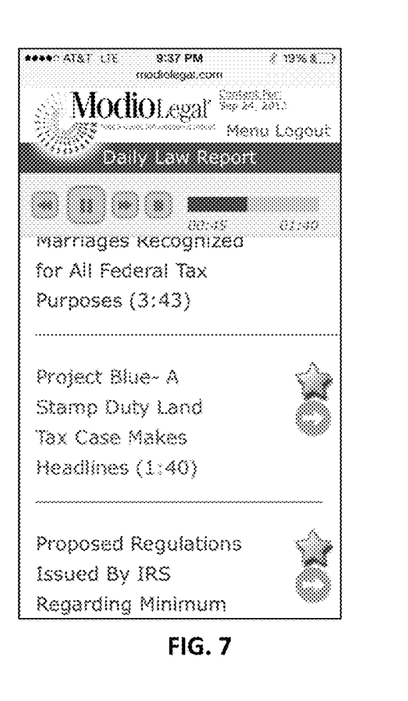
FIG. 7 illustrates a sample screenshot of a user interface displaying a plurality of audio narrations provided to a subscriber.
Figure 8:
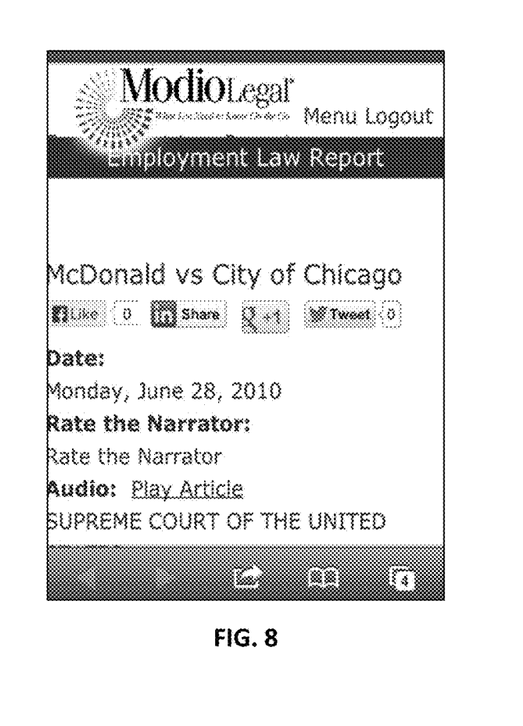
FIG. 8 illustrates another sample screenshot of the user interface for displaying audio narrations, including data assigned to individual narrations.

FIGS. 7-8 illustrate one exemplary content distribution and access embodiment, a smart phone or mobile computing interface.

FIG. 7 illustrates a sample "landing" page greeting the user upon login. The landing page includes a listing of available articles, which in one embodiment allows the user to scroll through the list of article names. The display includes a list of available narrated articles. In the list of FIG. 7, each element can therein have a separate display page for the content.

FIG. 8 illustrates a sample screenshot of that content-specific display page. This sample screenshot illustrates further information for a sample narrated article, the example being a "McDonald vs City of Chicago" article. Via this screen, the user can select to play the audio portion, learn more about the narrator or other features found within a user interface, such as share the article, post to social media, rate the article itself, access a text version of the article or article summary, etc. It is noted that this sample screenshot illustrates an optional secondary display screen for the specific article, but as described herein, the audio content may be accessed via the interface of FIG. 7, such as allowing the user to listen to the narrated content directly from the interface screen of FIG. 7. In one embodiment, the subscriber may navigate to the secondary display screen for the specific article using the icon resembling a gray circle with an arrow in it shown in FIG. 7.

In one embodiment with the interface, a subscriber may listen to an article by pressing the play/pause button in the fixed header, navigate to the article immediately above or below the article playing using the forward or backward arrows in the fixed header, stop an article using the stop button in the fixed header, jump ahead or back by tapping the progress bar in the fixed header or using buttons to jump ahead or back in fixed time increments. In another embodiment, the user may actively select the article itself in the interface of FIG. 7 for the automated playback. In one embodiment, the interface is set up so that absent the controls being used, once one article finishes, the next article will automatically start to play in sequence. Or alternatively, the user may select navigation arrows to jump from article to article as requested. Further embodiments of article navigation or selection include interface functionality to allow the user to compile or sequence the narrations into a preferred or desired list, including in one embodiment allowing the movements of the titles into a desired sequence via the interface. Therefore, when in the sequence, the articles can be played in a continuous sequence in the desired order. In one embodiment, via the listening interface, the user can then listen to the narrated content in a continuous sequence (e.g. as if they are combined for a continuous broadcast) and/or adjust the navigation via navigation controls during the broadcast, e.g. skip ahead, rewind, or otherwise navigate within the articles or from article to article.

It is recognized that additional information may be included within the article title, including for example the display of an article length. In one embodiment, the length of the narration may be displayed concurrent with a title, allowing the user to readily ascertain the length of the narration prior to investing time and energies to listening to the content.

In one embodiment, the user/subscriber may star and un-star articles which when highlighted, place articles onto the Starred Articles page accessed through the Menu button in the upper right of the fixed header (described below). This is an important feature for subscribers intending to access articles while driving—it allows them to pre-select the articles they would like to hear while excluding the ones they do not want to hear without having to manipulate their phone while commuting. Simply tap the star corresponding to the articles you would like to hear, navigate to the Starred Articles page using the menu button and the articles will play in sequence. In another embodiment, the user may rate the narrator, in one example using a five-star rating system and selecting between one and five stars.

In another embodiment, the interface may include a visual indicator that indicates when the user has listened to the audio narration. For example, the interface may include a dot that is hollow when the article narration first appears and the dot is bold or solid when the narration has been listened to. It is recognized that any other type of indicator may be used, including for example bolding the title of the article to indicate a not-yet-listened to article, similar to an electronic mail interface to indicate if a message has been read. In addition to the audio content, one embodiment may include a link or access to the underlying written content. For example, where the user subscribes to a news distribution service and the narration is the article or an abstract of the article, an active link or other selection means can therein provide for the user to receive the full written article via any suitable distributions means. In one embodiment, the user may be redirected to the content provider's website or application for display or access to the content therein.

In embodiments wherein the narrated content is associated with, acquired from and managed through a third party service, the method and system may further include the coordination of user interface activities back to the third-party service. For example, if the user flags a print version of an article and that content is partnered with a publisher having its own website or interface used to distribute content, the audio narration distribution platform may therein interact with the publisher website or hosting application to indicate the flagged article as additionally flagged there also.

Another feature in the interface may include the ability for the user to email or otherwise electronically distribute the article and/or narrator to oneself. The narrations are accessible via the interface, but the user may wish to distribute the article/narration, such as sending the narration to a client or colleague. Thus, the interface may include a "send to" or "email to" feature allowing the user to transmit the narration itself as an embedded file or a link to the file.

In another embodiment, the user may customize the interface for ease of use. In one technique, the user may manually establish various fields by toggling fields on or off, or in another embodiment may move the location of various fields. In one embodiment, the user may be directed to a preferences or customization page allowing for the selection of various toggle commands to allow or deny various functional operations, including functionality as described herein, as well as functionality within the knowledge of one skilled in the art.

In another embodiment, the interface may include the ability to scan or otherwise skip forward in the narration of multiple articles. For example, the user may select a scan function where the audio for a first portion of the article is provided and after that first portion, the interface jumps to the next article. This may allow a user to scan multiple articles by listening to a reduced portion of the article. Inter-narration navigation is also provided, such as fast-forward, reverse, timed skip, etc. It is recognized that standard navigational interface functionality is provided for user management and navigation of the narrated content.

The scan function may operate based on either a time factor or a portion factor. For example, the user may establish a time determination of the first 30 seconds of the article before skipping forward. In another example, the scanning may be determined based on portions of the article, such as the title and the first paragraph.

Consistent with the scan functionality, it is also understood that the audio content may be stored and controlled on both a time and a section sequence. For example, an audio narration file may be composed of subcomponents of the article, including by way of example a title, a byline, a narrator, introduction or summary paragraph and article body. The audio narration may also be a unitary file subject merely to timing requirements.

In another embodiment of the interface, the subscriber may conduct word searching to identify articles, such as for example on topics. It is noted that in one embodiment, the user may be restricted to articles and/or content based on a subscription level, so the search function may exclude articles where the user cannot access, or in another embodiment provide results but prohibit access. For example, with prohibited access, the user may be given the option to upgrade their subscription to be granted access to such content.

The search may be new or old articles. The search can include previously listened and/or ranked articles. The subscriber may use the Menu button in the fixed header to navigate to the Starred Articles page, the All Publications Page (which lists the most recent day's articles for all the publications the subscriber is subscribed to), the most recent day's news for other publications the subscriber is subscribed to as well as previous days' article lists for the publications the subscriber is subscribed to.

Figure 9:
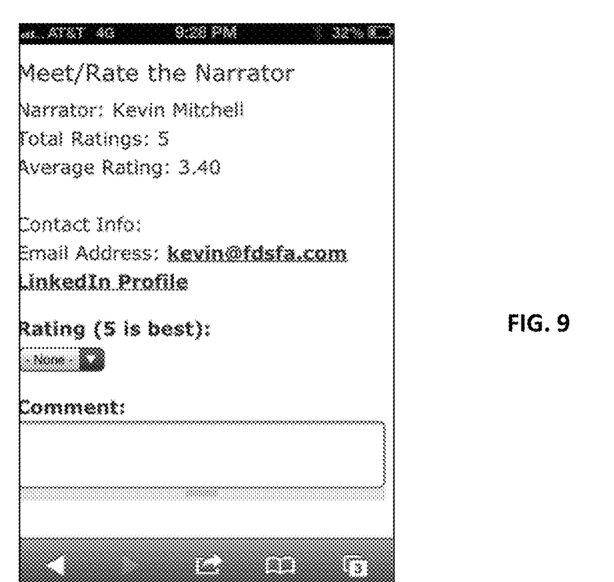
FIG. 9 illustrates a sample screenshot of the subscriber interface including a narrator feedback interface

FIG. 9 illustrates that upon article selection, the user (subscriber) is then given the option to "Meet/Rate the Narrator." In one embodiment, this may be an active link embedded in the interface.

Once on the "Meet/Rate the Narrator" page, subscribers can view the total number of ratings given to the narrator corresponding to the article, view the narrators average rating, contact the narrator via email or navigate to the narrators Linkedin profile (for purposes of evaluating the narrator for employment for example), rate the narrator themselves and/or provide a comment regarding the narrator's performance.

The narrator comments are also visible and available to the hosting or distribution platform. Therein, this information can be used for selecting or otherwise retaining narrators for future article narrations, or any other form of quality control as recognized by one skilled in the art.

In one embodiment, techniques are provided for communication or follow-up between subscribers and narrators. For example, one embodiment may include narrators as students, which are prospective employees. Thus, the narrator may wish the opportunity to meet and seek employment with subscribers. For example, a narrator may be given the opportunity to include a "profile" portion on a content distribution page, or in another embodiment the text version of the article may include an active embedded link to a bio page for the narrator.

As described herein, one embodiment provides for the interface using a tactile interface, such as a touchscreen interface of a mobile device. In another embodiment, the interface may include audio or visual commands. In one embodiment, the user may instruct the interface to advance to a next article via a voice command, such as operating in a complete hands-free environment. For example, if the user is driving a car, the user may request to skip to the new article via a voice command. It is recognized that verbal commands may be applicable to any suitable command.

From anywhere on the interface, navigate back to the most recent day's articles for their primary publication by tapping the logo in the upper left. Further navigation functionality, as recognized by one skilled in the art, may be include and is within the scope of the present invention.

Because the system allows subscribers to make article specific content decisions, the system also includes the capability of tracking subscribers' "reading" habits. It organizes this information into subscriber, article and publication oriented analytics that can be viewed by the company and content providers.

When subscribers register on the interface, they may have the ability to opt out from their individual reading habits being viewable. Their habits will still be factored in the aggregate calculations but will not be tied to them as individuals. The subscriber analytics detailed below are only available for subscribers that have not affirmatively opted out.

Subscription analytic metrics tracked for subscribers can include, but are not expressly limited to: (1) Site Visit Statistics: total site visits; and days as a member; (2) Cross-Publication Article Statistics: total articles played (across all publications); and average articles played per day (across all publications); (3) Publication Specific Statistics: Total articles played (within a given publication); and Daily average of articles played (within a given publication); and (4) Listing of all the articles within all the subscriber's publications organized by publication and a designation of whether the subscriber played or did not play each article.

In addition to article metrics, another embodiment may include readership metrics tracking the subscriber's review of various materials. For example, one embodiment may include a recommendation engine providing recommended content to the user, using known recommendation engine techniques based on user profile information and/or other subscriber and article metrics.

Figure 10:
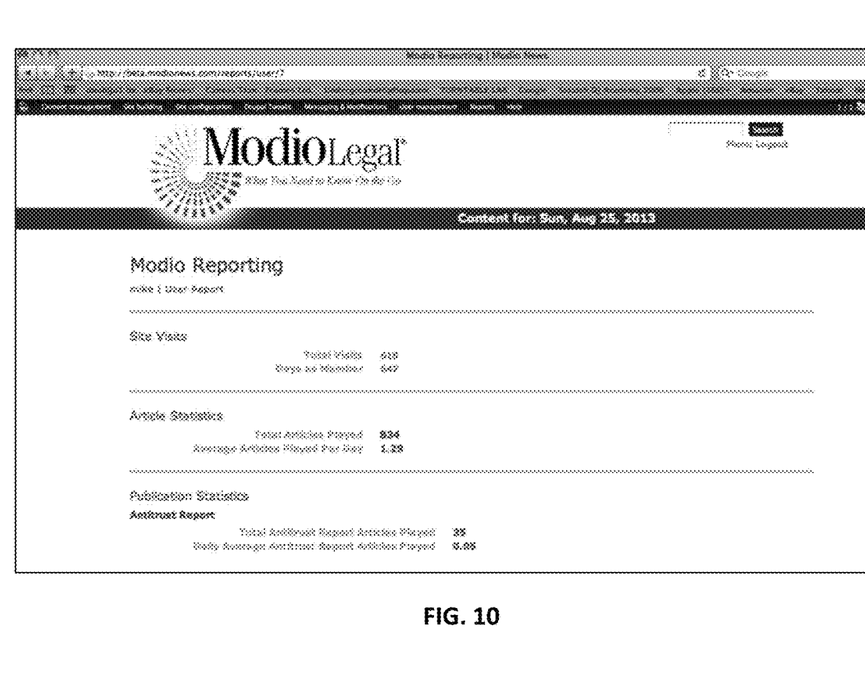
FIG. 10 illustrates a screenshot for tracking and reporting subscriber interaction with audio narrations.
Figure 11:
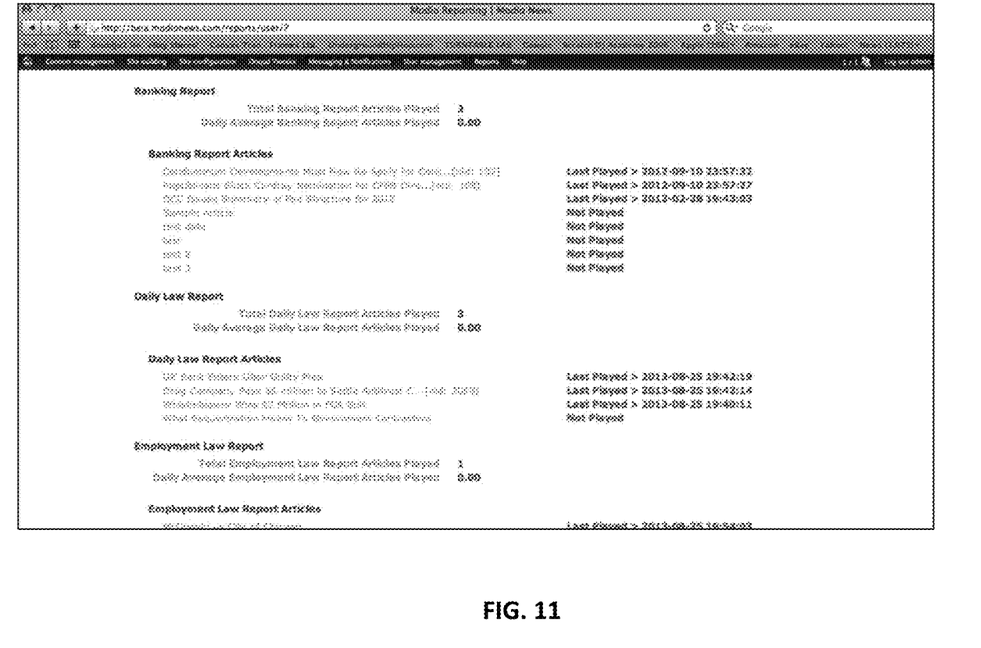
FIG. 11 illustrates another screenshot for tracking and reporting subscriber interaction with audio narrations.

FIGS. 10-11 illustrate sample screenshot of subscriber reporting functionality.

Similar to functionality, the article hosting system may further include functionality for determining article-specific analytics.

In one embodiment, article metrics tracked for articles include, but are not limited to: Number of subscribers who played the article; Listing of subscribers who played the article (who have not opted out);

The metrics above may be refined using any or all of the following subscriber demographic criteria: age, gender, primary area of specialization, years experience, job position, average daily one way commute, and primary mode of commute.

The tracking of article metrics may be done either through a computing interface if the user accesses the content via a web browser or in the embodiment where the content access is a via a smartphone app, the app itself can track metrics. Such tracking includes the collection of metrics and distribution of metric information back to one or more servers for collecting, collating and analyzing such metric information.

The present method and system includes back-end processor operations, executable instructions, being executed by one or more processing devices, performing the functionality described herein. The processing devices may be in one or more computing devices, such as for example a server accessible via a networked connection or in another embodiment a plurality of servers executing in a distributed computing environment.

Further improvements include feedback or personalization with narrator. In the embodiment described above, the narrator may be a student enrolled in a profession degree program, narrating articles having content relating to the particular profession. In the example given above, the narrator may be a law student and the articles are designed for distribution and consumption by lawyers. Therefore, one embodiment may include allowing the familiarity with the narrator.

Figure 12:
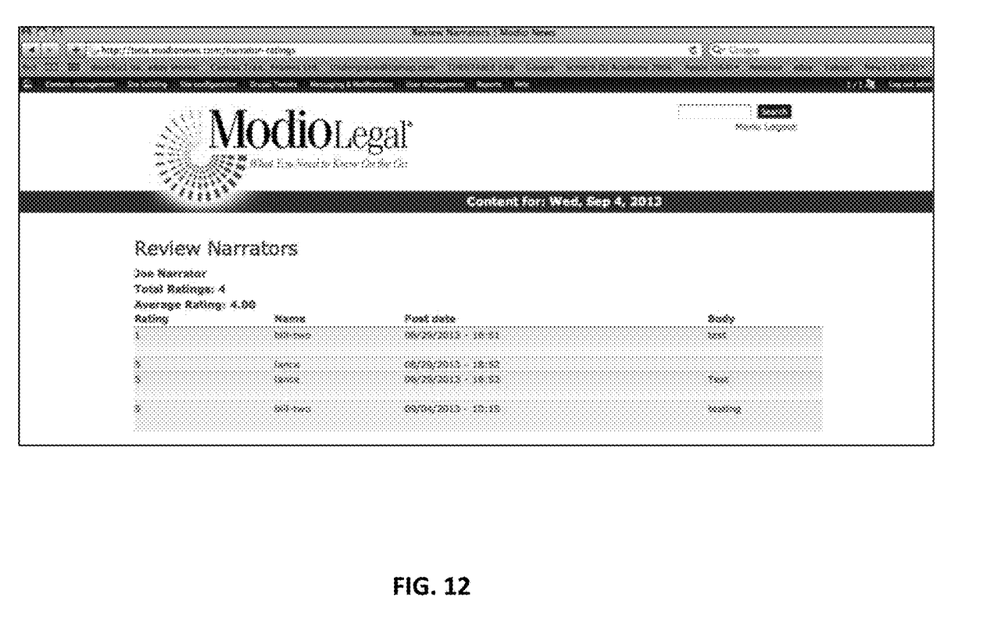
FIG. 12 illustrates a sample screenshot illustrating the tracking and review information of narrators.

FIG. 12 illustrates a sample screenshot of narrator review information.

The present method and system further provides for additional integration with other data aggregation services.

For example, the audio content may be a component of a larger content aggregation and distribution system.

There are existing data and content aggregation services that take content from various print sources and offer them to professionals. These existing aggregation services use complex algorithms to specify and direct content to the recipients, but these aggregation services are limited to merely refining existing content. The present method and system translates content into a more usable format, an audio narration, specifically tailored to the subscriber, thereby affording time efficiencies for the subscriber by listening to the time-sensitive content. In combination herein, the present method and system is further operable in conjunction with aggregation services, including for example inclusion of narrated audio content in the generated aggregated content provided to a user. For example, if a user has a content feed from an aggregation service, that feed can include articles but may further include narrated content, where such content selection is based on numerous factors, including aggregation factors used by the data aggregator to generate the feed itself. Similarly, in one embodiment the narrated content interface may be incorporated or otherwise available via the content aggregation services, facilitating user access to narrated content in place of or in conjunction with distributed written or visual content. In another embodiment, the aggregation techniques used by the aggregation services are incorporated into the present method and system to refine the articles presented to individual users accessing the interface screen of FIG. 7.

Moreover, the method and system facilities opportunities for narrators to generate the content and gain exposure to potential employers.

The present method and system further provides a marketing platform with the ability to deliver content from multiple firms to the same user. In addition to the narrated content, advertisers or content providers may then send a link to the users and that link allows the user to not only see that news feeds on the interface, but additional content, such as paid content. In further embodiments, the narrated content may include advertising, including visual advertisements placed within the user interface or in another embodiments ads embedded within the narrated content. For example, if the narrated content is directed to an audience of attorneys, advertising content may include a quick 10 or 15 second spot about an upcoming legal education seminar or a software service for the attorney, where such ad is either read into the narration by the narrator or inserted after the narrator completes the narration. In one example, the advertisement may be heard after a first interval of the narrated content, such as after 30 seconds of narrated content or for example after the second paragraph of narrated content, the ad is then inserted. It is noted that the ads may be general advertising or can be focused or directed advertising based on the underlying narrated content. Furthermore, additional embodiments allow for the inclusion of advertisements to offset or subsidize a subscription cost, such as a free version of the narrated content including ads and a subscriber version excluding the ads.

Similarly, content feeds can be generated not only to an individual, but also to a corporation, firm, or group of professionals, such as a law firm providing the content to its attorneys but then generating the content for distribution to its clients.

The present method and system may further integrate into a customized portal for a specific service. For example, in the embodiment of the articles being law-related articles, the portal may be associated with a specific law firm and the method and system operative as a means for distributing client updates or alerts.

In addition to traditional content providers, the narrated content distribution system is further available and usable by entities seeking to maintain contact or update distribution with customers, clients, prospective clients or otherwise seeking to help establish or maintain reputational credentials in a particular topic. Using the platform in the context of marketing or client management, for example law firms themselves may utilize the platform to distribute content that they themselves are currently producing and sending to clients as touch pieces/to demonstrate expertise in a text format, in an audio format. Pharmaceutical companies/med device companies using our platform to distribute new information about drugs/devices rather than sending out reps. By placing content in the more convenient audio format, the content provider benefits from a higher level of exposure.

In this context with respect to law firms, the firms can have junior or summer associates read the articles as a way to keep them engaged, helps the firms to portray themselves as "cool", progressive, innovative, technologically savvy/cutting edge. For example, a summer associate may then be called upon during the ensuing school year to provide narrated content as a means to maintain an active relationship with the prospective employer.

In the context of professional firms themselves using the platform, rather than a link to the narrator, it may include just a link to the "Meet the Author," either their linkedin account or the bio on the professional firm's website, like the bios on law firm websites On embodiment may include customizing the narration interface header to show the licensing firm's name and/or logo more conspicuously. Further, enhanced analytics as described herein and known with the art for tracking content consumption can provide correlations between articles, publications/news feeds etc., such as for example everyone who read this article on oil drilling also read the article on Brazilian law, thus creating synergies within the firm where the articles are produced by people in different practice areas or specialties. By way of example, this may indicate relationships such as most of the people subscribed to ABC Law Firm's Tax News Feed are also subscribed to ABC Law Firm's M&A News Feed. Therein the method and system allows the law firm to reach out to the people who are subscribers to just one of the two to suggest that they subscribe to other, creating higher engagement.

In another example, rather than using one link to access law firm A's news in audio and another link to access Law firm B's news in audio, the user receives one link that allows them to access all of the feeds they have subscribed to across different firms. In another embodiment, the interface for the user may be a centralized platform to receive content from multiple sources. In the above example of law firm A and law firm B generating narrated content, the recipient (e.g. a client) may receive the narrated content from both law firms within its interface, allowing for the central disposition and collection of narrated content, as well as the content access, e.g. playing of audio. Moreover, similar to embodiments described above, the content may additionally include active links or other means to access written or other content associated with the article, such as access to the sender's original content being linked with an audio file of the content itself.

The method and system is further expandable to any suitable technology or profession. The method and system operates optimally in a profession having ongoing current developments, thus the system can be utilized in accounting, medical, marketing, pharmaceutical, legal, IT, engineering, entertainment etc. The system is also operative with mainstream media, wherein subscribers may be designate updates for current events or articles associated with celebrities, artists, etc.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

By providing print media content in a word-for-word audio format, print publishers shift the basis of competition among print sources from content attributes to convenience—an attribute that has not been commoditized and is much more tangible/easy to measure. Additionally, it offers the more substantive content of print during times of the day that have previously been monopolized by TV and radio (ex. exercising, commuting), enhancing the demand for their content.

For subscribers, the word-for-word audio format converts the content to a format pre-disposed to multi-tasking, dramatically reducing the opportunity cost of accessing it. Rather than forgoing all other possible activities, professionals now only forgo their next best secondary activity during primary activities like commuting, exercising, riding a bike etc. For all professionals, this format saves time and stabilizes their access to the critical information necessary for fulfilling their job responsibilities. For attorneys specifically, it has the added benefit of enhancing their billing capacity.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; flash memory devices; mini- or micro-SD cards, memory sticks, and others.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

What is claimed is:

1. An electronic content generation and distribution method for generating and distributing audio content from time-sensitive written content having a defined time sensitivity, the method comprising:
    accessing a narrator data database having narrator data listed therein, the narrator data list including a plurality of narrators wherein each of the plurality of narrators are students;
    selecting a narrator using the narrator data from the narrator data database for generating an audio narration of the time-sensitive written content, wherein the narrator is different from the author of the written content, the selecting of the narrator is based on educational familiarity of the narrator with a subject matter of the time-sensitive written content based on a comparison of the subject matter of the time-sensitive written content with a field of study for each of the plurality of students and availability of the narrator based on the time sensitivity of the time-sensitive written content;
    electronically distributing the written content to the selected narrator;

within a defined time period, the time period based on the time sensitivity of the time-sensitive written content, receiving an audio narration generated by the selected narrator;

assigning a plurality of content identifiers to the audio narration based on at least one of: the written article and the narrator;

accessing a subscriber database including subscriber information and subscriber preference data;

electronically comparing the plurality of content identifiers to the subscriber preference data to determine a distribution list for the audio narration; and distributing the audio narration to subscribers designated in the distribution list.

2. The method of claim 1 further comprising:
where a content interface application is operative to monitor the subscriber engaging the audio narration; and
receiving engagement tracking information based on the monitoring of the subscribers engaging the audio narration.

3. The method of claim 1, wherein the content interface application is accessible via a web page.

4. The method of claim 1 further comprising:
receiving a ranking of the narrator from the subscriber.

5. The method of claim 1 further comprising:
associating advertising content with the written content; and
distributing the advertising content with the audio narration.

6. The method of claim 1, wherein the distributing the audio narration includes distributing an active link for user access to the written content.

7. The method of claim 6, wherein the active link includes electronic communication with the narrator.

8. The method of claim 1, wherein the distributing the audio narration further includes an electronic distribution selection option for the subscribers to at least one of: electronically forward the audio narration, electronically forward an active link to the audio narration, electronically forward a copy of the written content, and electronically forward an active link to the written content.

9. The method of claim 1, wherein distributing the audio narration includes distributing identifying information enabling the subscriber to engage with the narrator, the contact information includes at least one of: an audio introduction by the narrator; and a link to an electronic profile page of the narrator.

10. The method of claim 1 further comprising:
associating the audio narration with at least content aggregation service; and
distributing the audio narration via the at least one content aggregation service.

11. A system for generating and distributing audio content from time-sensitive written content having a defined time sensitivity, the system comprising:
computer readable medium having executable instructions stored therein; and
at least one processing device, in response to the executable instructions, operative to:

access a narrator data database having narrator data therein, the narrator data list including a plurality of narrators wherein each of the plurality of narrators are students;

select a narrator using the narrator data from the narrator data database for generating an audio narration of the time-sensitive written content, wherein the narrator is different from the author of the written content, the selecting of the narrator is based on educational familiarity of the narrator with a subject matter the time-sensitive written content based on a comparison of the subject matter of the time-sensitive written content with a field of study for each of the plurality of students and availability of the narrator based on the time sensitivity of the time-sensitive written content;

electronically distribute the written content to the selected narrator;

within a defined time period, the time period based on the time sensitivity of the time-sensitive written content, receive an audio narration generated by the selected narrator;

assign a plurality of content identifiers to the audio narration based on at least one of: the written content and the narrator;

access a subscriber database including subscriber information and subscriber preference data;

electronically compare the plurality of content identifiers to the subscriber preference data to determine a distribution list for the audio narration; and distribute the audio narration to subscribers designated in the distribution list.

12. The system of claim 11 further comprising:
where a content interface application is operative to monitor the subscriber engaging the audio narration; and
the at least one processing device operative to receive engagement tracking information based on the monitoring of the subscribers engaging the audio narration.

13. The system of claim 11, wherein the content interface application is accessible via a web page.

14. The system of claim 11 further comprising:
receive a ranking of the narrator from the subscriber.

15. The system of claim 11 further comprising:
associating advertising content with the written content; and
distributing the advertising content with the audio narration.

16. The system of claim 11, wherein the distributing the audio narration includes distributing an active link for user access to the written content.

17. The system of claim 11, wherein the distributing the audio narration further includes an electronic distribution selection option for the subscribers to at least one of: electronically forward the audio narration, electronically forward an active link to the audio narration, electronically forward a copy of the written content, and electronically forward an active link to the written content.

* * * * *